(12) United States Patent
Lee et al.

(10) Patent No.: US 7,041,214 B2
(45) Date of Patent: May 9, 2006

(54) WASTE WATER TREATMENT SYSTEM

(75) Inventors: Seo-Young Lee, Suwon (KR);
Jong-Gyung Kim, Osan (KR);
Hyun-Suk Cho, Seoul (KR);
Sung-Woo Kim, Seoul (KR);
Jung-Yong Kim, Suwon (KR);
Jae-Keun Seo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 10/621,580

(22) Filed: Jul. 18, 2003

(65) Prior Publication Data

US 2004/0016703 A1    Jan. 29, 2004

(30) Foreign Application Priority Data

Jul. 23, 2002   (KR) .................. 10-2002-0043350

(51) Int. Cl.
*C02F 3/00*  (2006.01)
(52) U.S. Cl. ..................................... 210/150; 210/220
(58) Field of Classification Search ............... 210/616, 210/150–151, 220
See application file for complete search history.

(56) References Cited

U.S. PATENT DOCUMENTS

| 5,529,693 | A | * | 6/1996 | Yano et al. | ................ 210/614 |
| 5,569,634 | A | * | 10/1996 | Miller et al. | ................ 502/64 |
| 6,245,237 | B1 | * | 6/2001 | Blough et al. | ............... 210/620 |
| 6,858,144 | B1 | * | 2/2005 | Narita et al. | ................ 210/617 |

FOREIGN PATENT DOCUMENTS

| JP | 11299484 A | * | 11/1999 |
| JP | 2000254661 A | * | 9/2000 |
| JP | 2000263069 A | * | 9/2000 |

* cited by examiner

*Primary Examiner*—Chester T. Barry
(74) *Attorney, Agent, or Firm*—Volentine Francos & Whitt, PLLC

(57) ABSTRACT

An agent is used to treat waste water containing dimethylsulfoxide and includes a solution of a porous material at a concentration of 6500 to 7500 mg/L, where an average size of pore openings of the porous material in a range of 60–550 μm. The agent may be used in an aeration tank of a waste water treatment system, where the aeration tank is connected to a waste water tank for collecting waste water containing dimethylsulfoxide. A sedimentation tank of the system is connected to the aeration tank via a connection pipe for biologically decomposing the dimethylsulfoxide and settling sludge produced therein, and a treated water tank of the system returns a portion of treated waste water to the waste water tank and collects the remaining treated water therein.

7 Claims, 3 Drawing Sheets

WASTE WATER TREATMENT SYSTEM

BACKGROUND OF THE INVENTION

1. Field of the Invention

The present invention generally relates to an agent for treating waste water and to a waste water treatment system, and more particularly, the present invention relates to an agent for treating waste water containing non-biodegradable dimethylsulfoxide and to a waste water treatment system which utilizes the agent.

A claim of priority is made to Korean Patent Application No. 2002-43350, filed on Jul. 23, 2002, and entitled "WASTE WATER TREATING AGENT AND WASTE WATER TREATING SYSTEM", which is hereby incorporated by reference in its entirety.

2. Description of Related Art

Waste water has conventionally been treated by an activated sludge process which is a kind of biological waste water treatment process. However, such a process is generally ineffective in decomposing toxic dimethylsulfoxide contained in the waste water, and accordingly, non-decomposed dimethylsulfoxide is usually released into rivers after being sufficiently diluted so as to comply with environmental regulations. Accordingly, the waste water treatment efficiency is adversely impacted because the toxicity of dimethylsulfoxide causes shock to microorganisms, called microbe shock.

Dimethylsulfoxide is used in the fabrication of liquid crystal displays (LCDs). Generally, dimethylsulfoxide is produced in such a way that heated methanol gas reacts with hydrogen sulfide to generate dimethysulfide, and then the dimethylsulfide reacts with nitrogen to produce dimethylsulfoxide. The dimethylsulfoxide produced by the foregoing process has a double reactivity characteristic, so that it can be oxidized by reacting with a strong oxidizing agent or reduced by reacting with a strong reducing agent. The reduced dimethylsulfoxide exhibits toxicity, causing microbe shock as mentioned above. As explained below, the conventional biological waste water treating process is not well-suited for treating waste wafer containing dimethylsulfoxide.

FIG. 1 illustrates a conventional dimethylsulfoxide treatment system employing a typical biological waste water treatment process.

Referring to FIG. 1, dimethylsulfoxide contained in industrial effluent is gathered together to a water tank 20 via a dimethylsulfoxide tank 10, and then transferred to an aeration tank 30 via a connection pipe 60. In the aeration tank 30, organic substances contained in the waste water are decomposed by microorganisms such as activated sludge. Then, the waste water is transferred to a sedimentation tank 40 and the organic substances and dimethylsulfoxide are settled to the bottom of the sedimentation tank 40. Then, a portion of treated waste water in the sedimentation tank 40 is transferred to a treated water tank 50 and the remainder is returned to an aeration tank 30 so as to dillute the concentration of dimethylsulfoxide.

In the system of FIG. 1, since dimethylsulfoxide is almost non-biodegradable, the only treatment realized with respect to the dimethylsulfoxide is dilution of the dimethylsulfoxide.

Further, only demand oxygen (DO) and mixed liquor suspended solid (MLSS) concentration in the aeration tank 30 are controlled as management factors of the conventional biological waste water treatment system. The conventional system is not able to effectively deal with the lowered efficiency of the waste water treatment and microbe shock caused by toxicity of the reduced dimethylsulfoxide.

In fact, after operating the conventional waste water treatment system in FIG. 1 to treat waste water containing dimethylsulfoxide, it is observed that the quality of the treated waste water is degraded due to the lowered waste water treatment efficiency, thus making it difficult to realize a water quality in compliance with environment standards.

SUMMARY OF THE INVENTION

An objective of the present invention is to provide a waste water treatment system, and waste water treatment agent therefor, capable of decomposing the non-biodegradable chemical compound of dimethylsulfoxide contained in waste water.

In accordance with one aspect of the present invention, an agent is provided for treating waste water containing demethylsulfoxide, the agent including a solution of a porous material at a concentration of 6500 to 7500 mg/L, where an average size of pore openings of the porous material in a range of 60–550 µm.

The porous material is preferably zeolite.

In accordance with another aspect of the present invention, a waste water treatment system includes a waste water tank for collecting waste water containing dimethylsulfoxide, an aeration tank connected to the waste water tank via a connection pipe and containing a solution of a porous material at a concentration of 6500 to 7500 mg/L, where an average size of pore openings of the porous material in a range of 60–550 µm, a sedimentation tank connected to the aeration tank via a connection pipe for biologically decomposing the dimethylsulfoxide and settling sludge produced therein, and a treated water tank for returning a portion of treated waste water to the waste water tank and collecting the remaining treated water therein.

The waste water tank preferably contains dimethylsulfoxide oxidized by air externally blown.

The connection pipe between the waste water tank and the aeration tank transports the waste water containing dimethylsulfoxide preferably at a rate of 25–35 ton/hr from the waste water tank to the aeration tank.

Preferably, the aeration tank contains over-aerated waste water containing dimethylsulfoxide.

Preferably, demanded oxygen is 4–5 ppm in the over-aerated waste water.

Preferably, the porous material is zeolite.

Preferably, the aeration tank contains sodium hydroxide in an amount of about 2.4 Kg per one ton of the waste water in the aeration tank to maintain a pH level in a range of 6.8–7.2.

Preferably, sludge retention time (SRT) in the waste water treating system is 400 days.

BRIEF DESCRIPTION OF THE DRWINGS

These and other features and advantages of the present invention will be readily apparent to those of ordinary skill in the art upon review of the detailed description that follows when taken in conjunction with the accompanying drawings, wherein like reference numerals denote like parts, and in which.

DETAILED DESCRIPTION OF THE PREFERRED EMBODIMENTS

Figure 1:
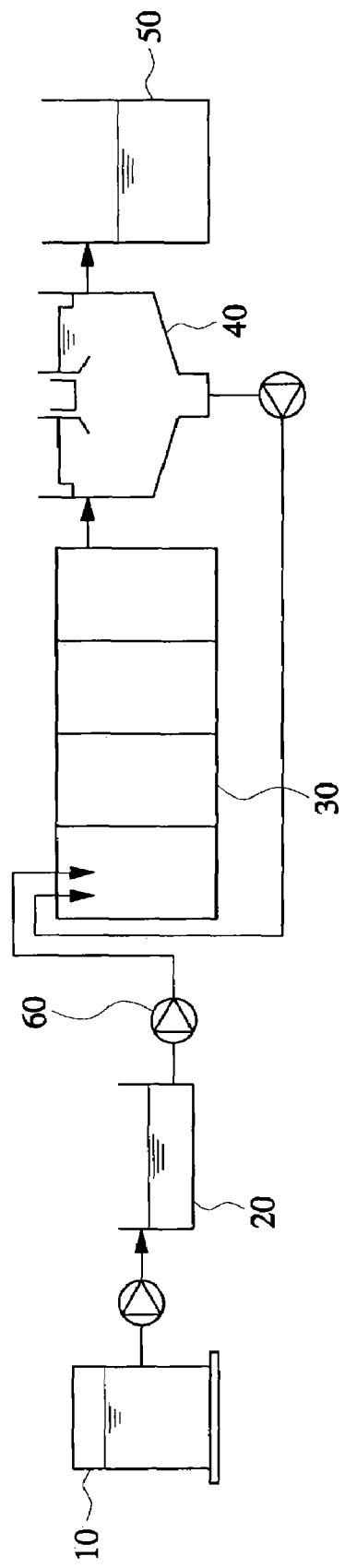
FIG. 1 is a schematic cross-sectional view of a conventional waste water treatment system.
Figure 2:
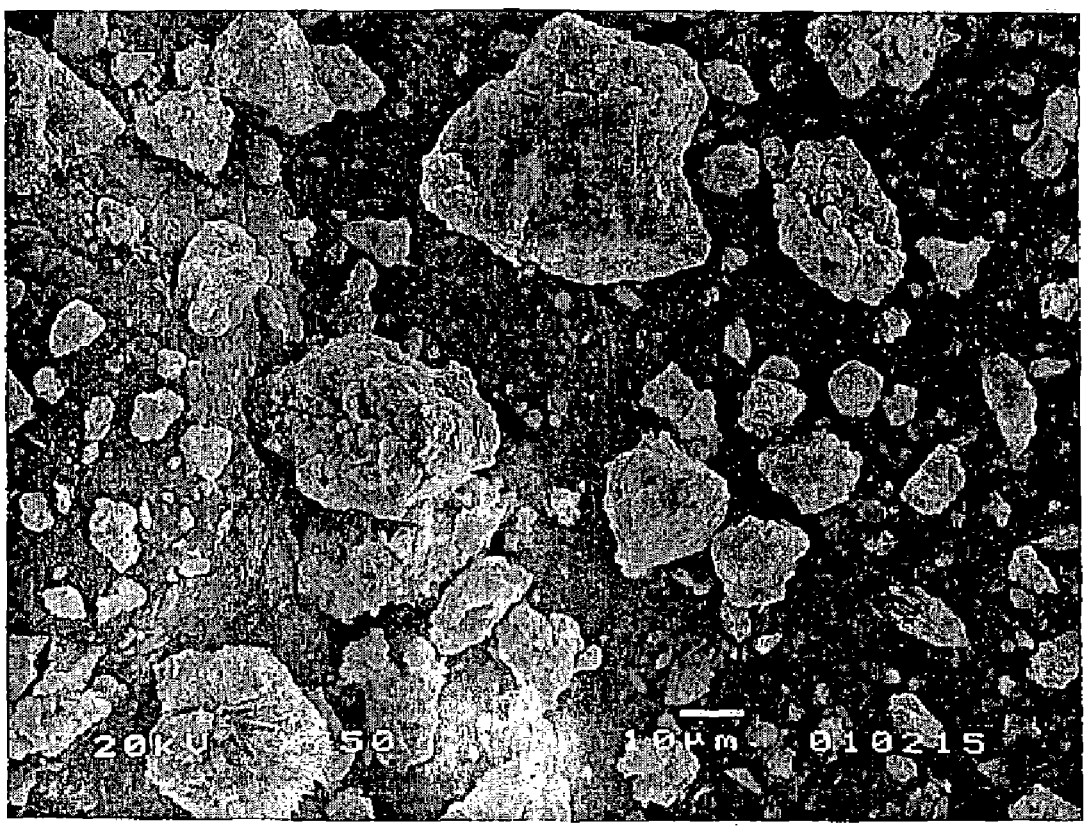
FIG. 2 is a photograph showing zeolite magnified 750 times, which is used in a waste water treatment system for treating waste water containing dimethylsulfoxide in accordance with an embodiment of the present invention.

FIG. 2 is a photograph showing zeolite magnified in size by 750 times. As shown in FIG. 2, zeolite is a porous material having a plurality of fine pores of irregular sizes. The average size of the pore openings is typically in the range of 60 to 550 μm, and the typical main components of zeolite are shown in Table 1.

TABLE 1

| Component | O | Na | Mg | Al | Ti | Si | K | Zr | Fe |
|---|---|---|---|---|---|---|---|---|---|
| Composition Ratio (%) | 45.2 | 1.04 | 3.2 | 9.2 | 0.9 | 31.0 | 2.0 | 0.8 | 6.5 |

Zeolite has a characteristic which causes organic substances to be decomposed in a microbic membrane fast and effectively, which is easily formed on the surface of the zeolite in the way that bacteria and other microorganisms stick to the zeolite with affinity. As shown in FIG. 2, zeolite is a porous material with irregular pores, and microorganisms such as bacteria are liable to stick to the fine pores to form a microbic membrane thereon. The microbic membrane biologically decomposes organic substances.

Typically, waste water contains positively charged heavy metals, more specifically positively ionized, acting to suppress growth and multiplication of microorganisms. Zeolite may remove such positive ions of heavy metals by ion exchange, thereby increasing activation of the microorganisms.

Further, zeolite is able to remove water-soluble organic substances contained in waste water and impeding growth and multiplication of microorganisms by physically and chemically adsorbing them thereon, so that activation of microorganisms increases and treated water quality is improved. In particular, since the adsorption rate of the organic material is high, 70% of the organic substances are adsorbed on the surface of the zeolite in 2 to 3 hours.

Zeolite is a kind of microbe carrier used in the biological waste water treatment system of the embodiment of the present invention. Zeolite is also insoluble in the water and its specific gravity is slightly greater than that of water, for example, the specific gravity of zeolite to water is 1.25 to 1.15. Due to this low specific gravity of zeolite, there is little loss in pressure in the aeration tank 30 when zeolite is added therein.

The surface of the zeolite is sufficiently rough to define a large area on which the microorganisms adhere, and each fine pore thereof has an appropriate a size for enabling bacteria and other microbes to grow therein. On the other hands since zeolite is very stable physically and chemically, it exhibits non-crumbling characteristics under operational conditions of conventional biological treating systems, so that it can be frequently used in the waste water treatment system. In the embodiment of present invention, dimethylsulfoxide is classified as a specific material to be treated, and a porous material is input to a biological waste water treatment system to wherein an average size of pore openings of the porous material in a range of 60–550 μm decompose the dimethylsulfoxide. The porous material preferably has an average pore opening size in a range of 60 to 550 μm and has irregular surfaces. Zeolite represents a preferred porous material, but the porous material is not limited thereto.

Figure 3:
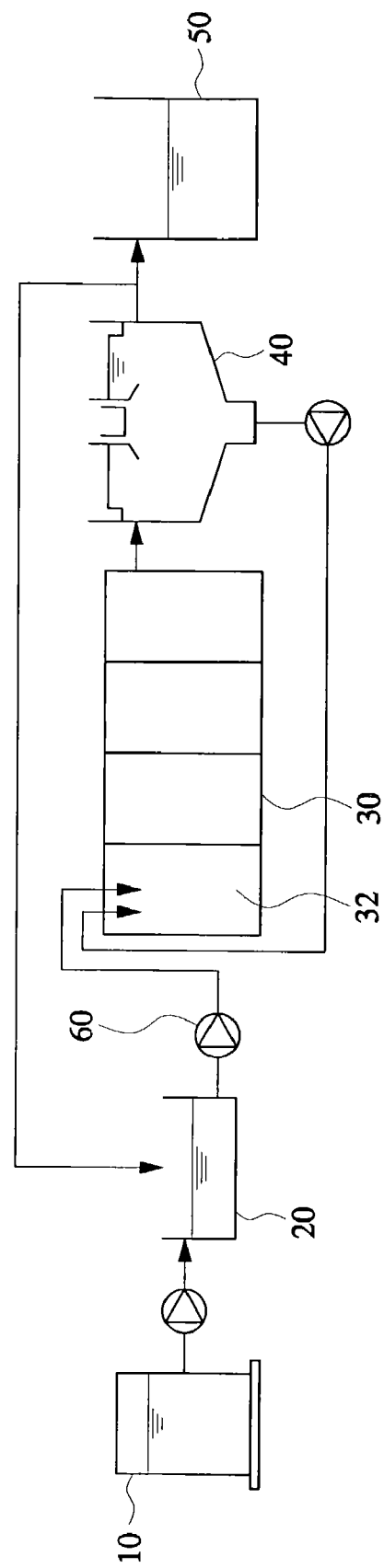
FIG. 3 is a schematic cross-sectional view of a waste water treatment system for treating a waste water containing dimethylsulfoxide in accordance with an embodiment of the present invention.

FIG. 3 illustrates a waste water treatment system for treating dimethylsulfoxide in accordance with the present invention. In drawings, like elements are designated by a like reference symbol.

Referring to FIG. 3, a waste water treatment system of the present invention includes a waste water tank 20 which collects waste water including dimethylsulfoxide therein and an aeration tank 30 connected to the waste water tank 20 via a connection pipe 60.

The waste water tank 20 collects dimethylsulfoxide transferred from a dimethylsulfoxide tank 10 along with waste water to primarily treat dimethylsulfoxide. Dimethylsulfoxide in the waste water tank 20 has a double chemical reactivity characteristic, i.e. it is oxidized by reacting with a strong oxidizing agent or reduced by reacting with a reduction agent. Furthermore, after being reduced, the toxicity of dimethylsulfoxide increases, so that the reduced dimethylsulfoxide reduces the number of microorganisms in the aeration tank 30.

Accordingly, to prevent the dimethylsulfoxide from being reduced, the air is blown into the waste water tank 20.

The waste water in the waste water tank 20 flows to the aeration tank 30 through the connection pipe 60. At this time, to prevent dimethylsulfoxide from being reduced, the waste water containing dimethylsulfoxide is transferred to the aeration tank 30 at a rate of 30 tons/hr, which is higher than that in a conventional sewage or waste water treatment system.

The dimethylsulfoxide transferred to the aeration tank 30 is biologically decomposed in the aeration tank 30 containing the porous material 32 and microorganisms therein.

As microorganisms to decompose dimethylsulfoxide, protozoan such as vorticella, amoeba and aspidisc may be used in the embodiment of the present invention. To enable the microorganisms to form microbe membranes effectively, the porous material 32 may be added to the aeration tank 30 along with the dimethylsulfoxide.

A preferable pore size opening of the porous material 32 is in a range of 60 to 550 μm and concentration of the porous material in the aeration tank 30 is in a range of 6500 to 7500 mg/L.

Zeolite preferably is used as the porous material. The porous material 32 is preferably in the form of a fine powder and floats on the waste water unlike a conventional carrier. Microorganisms having decomposability are adsorbed onto the surface of the porous material, so that a microbe membrane called floc is easily formed on the surface of the porous material. A surface area for contacting organic substances in the waste water is greater than that of a conventional material, and as a result, the organic substances are rapidly and effectively biological decomposed in the microbe membrane. The aeration tank 30 operates to maintain over-aeration and therefore the demanded oxygen DO level is maintained in a range of 4 to 5. The aeration tank 30 is further maintained in a chemically neutral pH range of 6.8 to 7.2, so as to improve activation of microorganisms by appending 2.4 kg/ton of sodium hydroxide.

The biologically treated waste water in the aeration tank 30 is transferred to the sedimentation tank 40 via the connection pipe 60. The waste water is separated by treated waste water, or decanted water, and sludge in the aeration tank 30. Out of the treated waste water, 30–50% thereof is returned to the original waste water tank 20 and mixed with waste water which is not treated in the waste water tank 20, and the remaining treated waste water is transferred to the treated water tank 50. In such way, a concentration fluctuation of the waste water may be minimized.

In accordance with the present invention, sludge retention time (SRT) is increased, so that the efficiency of treating organic substance is improved and the amount of sludge is reduced.

In a conventional waste water treatment system, SRT is typically 40 days, but the SRT of the waste water treatment system of the present invention is controlled to be 400 days. Accordingly, the sludge amount can be reduced to less than 10% of the sludge amount of the conventional waste water treatment system.

Table 2 shows operational conditions of waste water treatment systems in accordance with the conventional art and the present invention.

TABLE 2

| | Conventional waste water treatment system | Embodiment of present invention | Improvement rate |
|---|---|---|---|
| MLSS in aeration tank | 3,000–4,000 mg/L | 12,000 | More than 300% |
| SRT | 40 days | 400 days | More than 1000% |
| Sludge drawn amount | 27 m² | 2.7 m² | Less than 90% |
| Return of treated water | None | 30–50% | n/a |

Table 3 shows the quality of the treated waste water containing dimethylsulfoxide after treatment by the waste water treatment system in accordance with the present invention.

TABLE 3

| No. | Items | Unit | Untreated waste water Min.–max. | Avg. | Quality of treated water in conventional treating system Min.–max. | Avg. | Quality of treated water in the present invention Min.–max. | Avg. | Results |
|---|---|---|---|---|---|---|---|---|---|
| 1 | PH | mg/L | 9.0–9.5 | 9.2 | 6.8–7.2 | 7.0 | 6.8–7.2 | 7.0 | |
| 2 | TOC | mg/L | 238–445 | 360 | 6.0–52.0 | 14.0 | 1.6–4.2 | 3.0 | Less than 77.9% |
| 3 | BOD | mg/L | 651–670 | 660 | 4.7–52.0 | 15.0 | 1.8–4.7 | 2.6 | Less than 82.7% |
| 4 | COD | mg/L | 196–344 | 250 | 8.0–68.0 | 28.0 | 3.4–6.8 | 4.5 | Less than 83.9% |
| 5 | SS | mg/L | 0.1–0.8 | 0.38 | 15.0–58.0 | 24.0 | 2.1–8.1 | 4.3 | Less than 82.0% |

As illustrated in Table 3, in the embodiment of the present invention, the pH level is maintained at about 7.0 to keep the treated water in a neutral state. Further, it is shown that total organic carbon (TOC), biological oxygen demand (BOD), and suspended solid (SS) concentration in the treated water are reduced to $\frac{1}{4}$–$\frac{1}{7}$ of the respective levels of the conventional treated waste water, whereby the efficiency of treating waste water is significantly improved.

Thus, in the case of treating waste water containing dimethylsulfoxide by employing the waste water treatment agent and the waste water treatment system in accordance with the present invention, the quality of the treated water and the operation of the waste water treatment system may be stabilized, and dimethylsulfoxide which has not been decomposable can be biologically decomposed. As a result, dimethylsulfoxide concentration may be managed to levels below environmental management standards.

While the invention has been particularly shown and described with reference to preferred embodiments thereof, it will be understood by those of ordinary skill in the art that the foregoing and other changes in form and details may be made without departing from the spirit and of the scope of invention.

What is claimed is:

1. A waste water treatment system, comprising:
   a waste water tank for collecting waste water containing dimethylsulfoxide;
   an aeration tank connected to the waste water tank via a connection pipe and containing waste water treatment agent consisting essentially of zeolite at a concentration of 6500 to 7500 mg/L, wherein an average size of pore openings of the zeolite is in a range of 60–550 µm;
   a sedimentation tank connected to the aeration tank via a connection pipe for biologically decomposing the dimethylsulfoxide and settling sludge produced therein; and
   a treated water tank for returning a portion of treated waste water to the waste water tank and collecting the remaining treated water therein.

2. The system according to claim 1, wherein the waste water tank contains dimethylsulfoxide oxidized by externally blown air.

3. The system according to claim 1, wherein the connection pipe between the waste water tank and the aeration tank transports the waste water containing dimethylsulfoxide at a rate of 25–35 tons/hr from the waste water tank to the aeration tank.

4. The system according to claim 1, wherein the aeration tank contains over-aerated waste water containing dimethylsulfoxide.

5. The system according to claim 4, wherein dissolved oxygen is 4–5 ppm in the over-aerated waste water.

6. The system according to claim 1, wherein the aeration tank contains sodium hydroxide in an amount of about 2.4 Kg per one ton of the waste water in the aeration tank to maintain the pH in a range of 6.8–7.2.

7. The system according to claim 1, wherein sludge retention time (SRT) is 400 days.

\* \* \* \* \*